Feb. 3, 1970     H. A. RASCHKE     3,492,967
RECESSED MOUNT FOR BACK-UP ALARM
Filed Oct. 7, 1968

INVENTOR.
HERBERT A. RASCHKE
BY
Townsend + Townsend
ATTORNEYS

United States Patent Office 3,492,967
Patented Feb. 3, 1970

1

3,492,967
RECESSED MOUNT FOR BACK-UP ALARM
Herbert A. Raschke, Greenbrae, Calif., assignor to E. D.
Bullard Company, Sausalito, Calif.
Filed Oct. 7, 1968, Ser. No. 765,601
Int. Cl. B60q 5/00
U.S. Cl. 116—60                                    1 Claim

ABSTRACT OF THE DISCLOSURE

A back-up alarm for mounting on the wheel of a vehicle. A mounting structure for such back-up alarm that includes a tubular member that forms a recess into which a protruding wheel hub can extend, thereby to minimize the amount by which the back-up alarm projects from the wheel and from the side of the vehicle on which the wheel is mounted.

---

This invention relates to a structure for mounting a back-up alarm onto a wheel that has a protruding hub such that the amount by which the back-up alarm projects from the hub is minimized. According to the present invention, the mounting structure is recessed so that the hub is received in the recess and embraced by the alarm.

Reference is made to the following United States patents which show back-up alarms that are mountable on a vehicle wheel and that include a dish-shape bell, a base plate rigid with the bell and a hammer or like member carried by the plate for striking the bell in response to rotation of the wheel: No. 2,807,229; No. 2,843,075; No. 2,915,036; and No. 3,092,069. On certain vehicles, the wheel hubs are so formed that the hub extends exteriorly of the wheel and tire, and therefore projects beyond the tire when mounted on the vehicle. Installation of the back-up alarms of the type disclosed in the above-enumerated patents would, if not compensated for produce a further extension of the hub so as to expose the alarm to damage and to constitute a safety hazard to bystanders. The present invention affords such compensation and permits wheel mounted bells to be installed without adding an excessively large projection.

It is a principal object of the present invention to provide a bell-mounting structure that keeps to a minimum the distance that the bell projects from the wheel hub. Such object is achieved by providing a bell-mounting structure that has a hollow tubular member into which the wheel hub can be received. The tubular member has an outer diameter that is small enough to enter the concave side of the dish-shaped bell; the tubular member at its outer end has a web extending thereacross which includes means such as a bolt for securing the bell onto the web. A short spacer is provided for spacing the bell from the web by an amount sufficient to avoid damping the bell; the spacer, however, is made no longer than absolutely necessary for this purpose.

Figure 1:
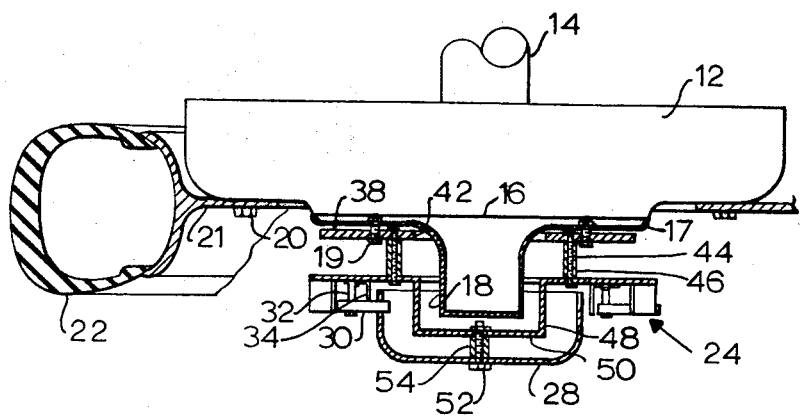
Figure 2:
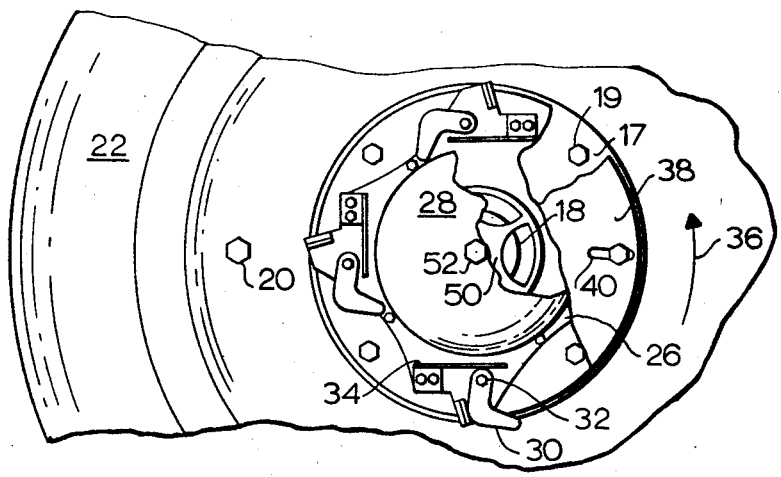

Other objects, features and advantages of the present invention will become apparent after referring to the following specification and accompanying drawings in which:

FIG. 1 is a cross section view of a back-up alarm mounted on a wheel hub by employment of apparatus according to this invention; and FIG. 2 is an elevation view of FIG. 1, portions being broken away to reveal certain internal details of construction.

Referring more particularly to the drawings, reference numeral 12 indicates a wheel that is mounted to a vehicle axle 14. The vehicle to which the axle 14 is mounted is of conventional form and requires no further disclosure for a complete understanding of the invention. Mounted on the outer side of wheel 12 is a hub 16 that includes a circular flange 17 and a lateral protuberance 18 which houses the end of axle 14 and bearings, grease seal, and like parts normally included in this environment. Flange 17 has holes therearound for hub mounting bolts 19 that secure the flange to wheel 12. Wheel 12, outwardly of hub 16, is provided with studs 20 for permitting installation on the wheel of a tire rim 21 that carries pneumatic tire 22. Up to this point, all that has been described is conventional and forms no part of the invention, but only the environment in which the invention is employed.

For illustrating the present invention, there is shown a back-up alarm 24 that is generally of the form disclosed in U.S. Patent No. 2,807,229. The present invention is not limited to such back-up alarm, however, the back-up alarm being merely exemplary. As described more fully in the above-mentioned patent, back-up alarm 24 includes a base plate 26, centrally of which is supported a dish-shaped or inwardly concave bell 28. Mounted on base plate 26 adjacent bell 28 is a bell striker, here exemplified by a hammer 30 that is pivotally mounted to the base plate on a stub shaft 32. A flat spring 34 associated with hammer 30 cooperates with the hammer to permit the hammer to strike bell 28 when wheel 12 is rotating in the back-up direction, indicated by arrow 36 in FIG. 2, and to prevent sounding of the bell when the wheel rotates in the forward direction.

For attaching the back-up alarm 24 to wheel hub 16, a mounting plate 38 is provided and has formed therein plural radially elongate holes 40 which are positioned around the mounting plate for engagement by at least two of the hub mounting bolts 19 that retain the hub onto wheel 12. Mounting plate 38 is formed with a central opening 42 that permits the mounting plate to be positioned flat against flange 17 of hub 16. Extending outwardly of mounting plate 38 are two or more mounting bolts 44 which secure base plate 26 to mounting plate 38; each mounting bolt is provided with a sleeve 46 for establishing a fixed parallel spaced relation between the base plate and the mounting plate.

Centrally of base plate 26 is affixed a tubular support 48 that has an inner diameter sufficiently large to receive therein hub protuberance 18 and an outer diameter sufficient to fit interior of the bell 28. At the outer end of tubular support 48, i.e., the end remote from base plate 26, is a web 50 that is centrally apertured to receive a bell-mounting bolt 52 therein. As can be seen in FIG. 2, web 50 is not solid but defines one or more openings between the central aperture and the periphery. A spacer sleeve 54 is provided between web 50 and bell 28 to space the bell outwardly so that it is not damped or muffled by contact with other parts of the device.

It will be clear from the foregoing description that in order to mount the back-up alarm onto the vehicle, it is only necessary to remove several hub mounting bolts 17 and to reinstall such bolts afer first passing them through holes 40 in mounting plate 38. Because of the presence of hollow tubular portion 48, hub protuberance 18 can enter into the concave side of bell 28 and thereby minimize the amount by which the bell projects outwardly from the wheel. It will also be clear that different sized hub protuberances can readily be accommodated by replacement of sleeves 46 with sleeves of a greater or lesser length.

Thus it will be seen that the present invention provides a back-up alarm that is mountable on a wheel hub without forming an excessively large and dangerous projection therefrom. Accordingly, the present invention reduces the likelihood that the backup alarm will be damaged by contact with stationary structures or bystanders past which the vehicle moves.

Although one embodiment of this invention has been shown and described, it will be apparent that other adap-

What is claimed is:

1. In combination with a back-up alarm of the type being mountable on a wheel that includes a flange and a central hub protruding from the flange and said alarm having a dish-shaped bell, a base plate rigid with the bell, and a striker mounted on the base plate for sounding the bell in response to rotation of the wheel, improved apparatus for mounting the alarm on the wheel comprising a generally tubular member having a central opening of diameter greater than the diameter of the hub, said tubular member having an inner end affixed to the base plate and an outer end remote from said inner end, a web attached to the tubular member at the outer end, means for securing the bell to said web, said web having at least one opening outwardly of said securing means, and means for affixing said base plate on said wheel with the wheel hub extending into said tubular member, said affixing means including an annular mounting plate having a central opening larger than the hub so that said mounting plate can be positioned contiguous with said flange, means for retaining said mounting plate on said flange, aligned holes in said mounting plate and said base plate, a plurality of bolts engaged in said aligned holes and extending between said mounting plate and said base plate, and a sleeve circumscribing each said bolt for selectively establishing a space between the wheel hub and said web.

References Cited

UNITED STATES PATENTS

| 2,807,229 | 9/1957 | Bookwalter | 116—35 |
| 2,843,075 | 7/1958 | Geraghty | 116—60 |
| 2,915,036 | 12/1959 | Bookwalter | 116—35 |
| 3,092,069 | 6/1963 | Baird | 116—60 |
| 3,123,040 | 3/1964 | Geraghty | 116—60 |

FOREIGN PATENTS

| 868,027 | 5/1961 | Great Britain. |

LOUIS J. CAPOZIO, Primary Examiner